US011778514B2

(12) United States Patent
Zheng

(10) Patent No.: US 11,778,514 B2
(45) Date of Patent: Oct. 3, 2023

(54) DATA ROUTER CONNECTIVITY TO WIRELESS COMMUNICATION SLICES

(71) Applicant: T-Mobile Innovations LLC, Overland Park, KS (US)

(72) Inventor: Pei Zheng, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 5 days.

(21) Appl. No.: 17/479,865

(22) Filed: Sep. 20, 2021

(65) Prior Publication Data

US 2023/0087341 A1    Mar. 23, 2023

(51) Int. Cl.
*H04W 28/22* (2009.01)
*H04W 28/08* (2023.01)
*H04W 28/24* (2009.01)

(52) U.S. Cl.
CPC ....... *H04W 28/22* (2013.01); *H04W 28/0983* (2020.05); *H04W 28/24* (2013.01)

(58) Field of Classification Search
CPC . H04W 28/22; H04W 28/24; H04W 28/0983; H04W 40/246; H04L 43/04; H04L 41/14; H04L 41/40
See application file for complete search history.

(56) References Cited

U.S. PATENT DOCUMENTS

| 10,341,868 | B2 | 7/2019 | Ross et al. | |
|---|---|---|---|---|
| 10,439,820 | B2 | 10/2019 | Egner et al. | |
| 10,452,824 | B2 | 10/2019 | Egner et al. | |
| 10,484,451 | B2 | 11/2019 | Rao et al. | |
| 10,929,189 | B2 | 2/2021 | Palermo et al. | |
| 2017/0155590 | A1* | 6/2017 | Dillon | H04L 43/0852 |
| 2018/0048545 | A1 | 2/2018 | Mishalov et al. | |
| 2018/0054237 | A1 | 2/2018 | Tseng et al. | |
| 2019/0045409 | A1 | 2/2019 | Rasanen et al. | |
| 2019/0303345 | A1* | 10/2019 | Zhu | G06F 12/1072 |
| 2020/0076875 | A1 | 3/2020 | Sabella et al. | |
| 2020/0313985 | A1* | 10/2020 | Jayakumar | H04L 43/04 |

* cited by examiner

*Primary Examiner* — Anez C Ebrahim

(57) ABSTRACT

A data router serves User Equipment (UEs) over network connections to network slices. The router executes an operating system, and in response, executes router applications in containers. The router applications receive a container configuration, a connection configuration, and a slice configuration from the wireless communication network. The router applications transfer the container configuration to the operating system. The operating system controls processing qualities of the containers based on the container configuration. The router applications generate and transfer the performance information for the network connections to the wireless communication network. The router applications prioritize the network connections to the network slices based on the slice configuration. The router applications exchange user data with the UEs and exchange the user data with the network slices over the network connections using service qualities based on the connection configuration.

20 Claims, 13 Drawing Sheets

DATA ROUTER CONNECTIVITY TO WIRELESS COMMUNICATION SLICES

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores.

The wireless network elements comprise Interworking Functions (IWFs), Access and Mobility Management Functions (AMFs), Session Management Functions (SMFs), User Plane Functions (UPFs), and the like. Some of the wireless network elements are grouped into wireless network slices for network services like low-latency remote-computing and high-bandwidth video-streaming. The wireless user devices connect to the specific network slices that are specially-purposed for their specific network services.

Data routers exchange Internet Protocol (IP) packets to facilitate various forms of network communications over both wireless and wireline connections. Some data routers directly interface with wireless user devices over communication protocols like WIFI and 5GNR. The data routers extend the range of the wireless network services that are delivered by the wireless communication networks. For example, a wireless user device may download video from a wireless network slice over a WIFI router that is connected to the wireless communication network over the internet. Unfortunately, the data routers do not effectively support wireless network slices. Moreover, the data routers do not efficiently enable the wireless communication networks to control router operations to support the wireless network slices.

TECHNICAL OVERVIEW

A data router to serves User Equipment (UEs) over network connections to network slices. The data router executes an operating system, and in response, executes router applications in containers. The router applications receive a container configuration, a connection configuration, and a slice configuration from the wireless communication network. The router applications transfer the container configuration to the operating system. The operating system controls processing qualities of the containers based on the container configuration. The router applications generate and transfer the performance information for the network connections to the wireless communication network. The router applications prioritize the network connections to the network slices based on the slice configuration. The router applications exchange user data with the UEs and exchange the user data with the network slices over the network connections using service qualities based on the connection configuration.

DETAILED DESCRIPTION

Figure 1:
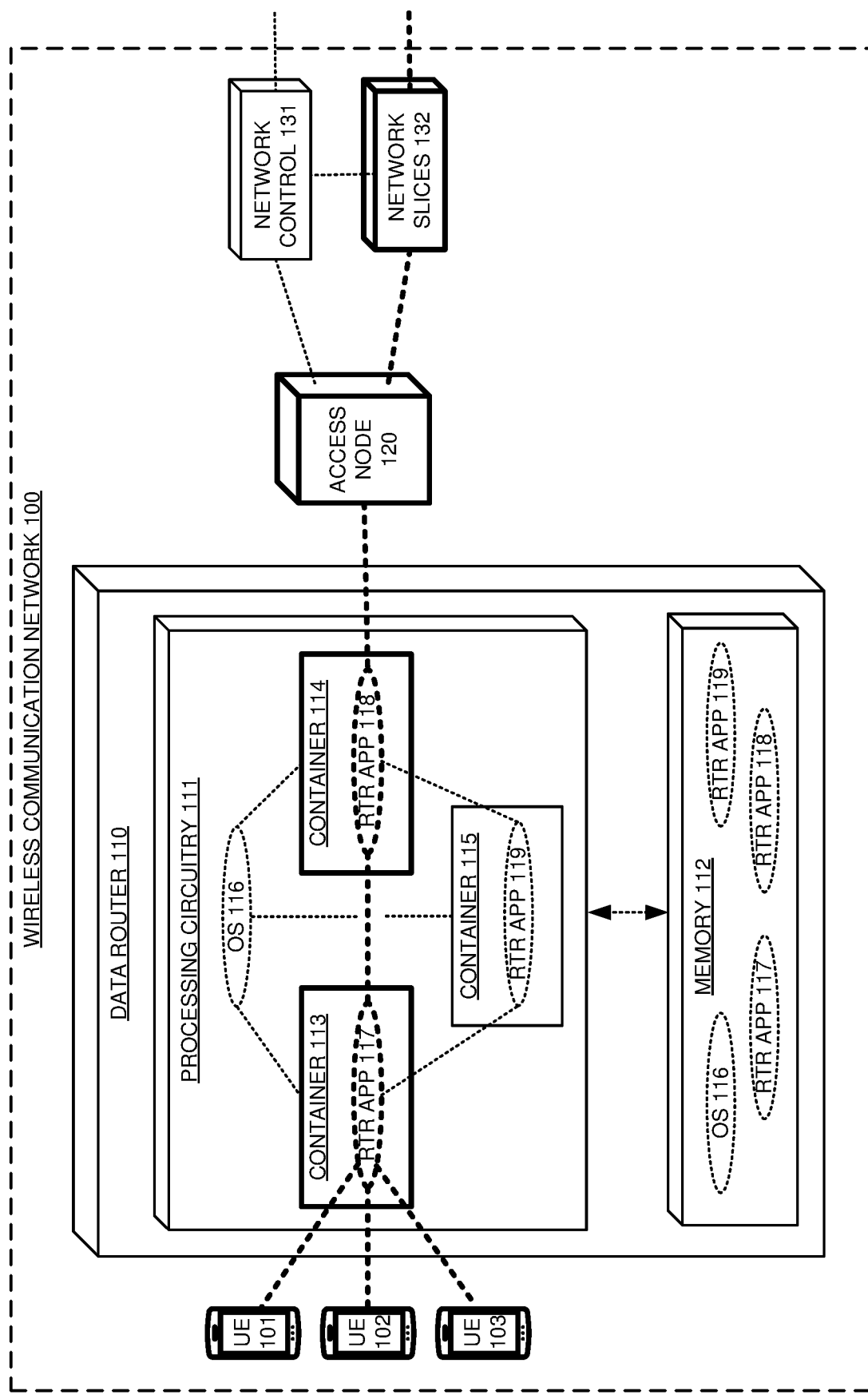
FIG. 1 illustrates an exemplary wireless communication network that has a data router to serve User Equipment (UEs) over network connections to network slices.

FIG. 1 illustrates an exemplary wireless communication network 100 that has data router 110 to serve User Equipment (UEs) 101-103 over network connections to network slices 132. Wireless communication network 100 comprises UEs 101-103, data router 110, access node 120, network control 131, and network slices 132. Data router 110 comprises processing circuitry 111 and memory 112 that are coupled together. UEs 101-103 comprise computers, phones, vehicles, sensors, robots, or some other data appliances with data communication circuitry. Exemplary wireless data services include machine-control, internet-access, media-streaming, social-networking, or some other networking product. Wireless communication network 100 is simplified for clarity and typically includes more UEs, routers, and access nodes than shown.

Various examples of network operation and configuration are described herein. In some examples, data router 110 stores operating system (OS) 116 and router applications (RTR APPs) 117-119 in memory 112. Processing circuitry 111 retrieves operating system 116 and router applications 117-119 from memory 112. Processing circuitry 111 executes operating system 116 to form containers 113-115, and containers 113-115 execute router applications 117-119 under the control of operating system 116. Router application 119 receives a container configuration, a connection configuration, and a slice configuration from network control 131 over access node 120 and router application 118. Router application 119 transfers the container configuration to operating system 116. Operating system 116 receives the container configuration from router application 119 and controls the processing qualities of containers 113-115 based on the container configuration from network control 131. Router application 117 exchanges user data with UEs 101-103. Router applications 117-118 exchange the user data. Router application 118 exchanges the user data with network slices 132 over network connections through access node 120 using service qualities that are indicated in the connection configuration. Router application 118 prioritizes the network connections to network slices 132 based on the slice configuration. Router application 119 generates performance information for the network connections and transfers the performance information to network control 131 over router application 118 and access node 120. Network control 131 may modify the container configuration, the connection configuration, and/or the slice configuration for data router 110 based on the performance information.

In some examples, router application 118 comprises a network application that executes in a network version of container 114, and router application 119 comprises an agent application that executes in agent version of container 115. The network application in container 114 receives the container configuration from network control 131 and transfers the container configuration to the agent application in container 115. The agent application transfers the container configuration to operating system 116. Based on the container configuration, operating system 116 controls Central Processing Unit (CPU) resources, Random Access Memory (RAM), Input/Output (I/O), and other computer resources used by containers 113-115 to execute applications 117-119. For example, operating system 116 may increase the CPU resources used by containers 113-114 to better support the user-plane and decrease the CPU resources used by container 115 which reduces support to the control-plane.

In some examples, router application 118 comprises a network application executing in a network version of container 114, and router application 119 comprises a monitor application executing in a monitor version of container 115. The network application in container 114 indicates data throughputs and latencies to the monitor application in container 115. The monitor application receives the data throughputs and latencies from the network application and transfers the data throughputs and latencies to network control 131 over application 118. Network control 131 processes the performance data to generate new configurations for containers, connections, and slices. Network control 131 transfers the new configurations to data router 110.

In some examples, router application 118 comprises a network application executing in network version of container 114, and router application 119 comprises a connection application executing in a connection version of container 115. The connection application in container 115 receives the connection configuration from network control 131 over access node 120 and the network application in container 114. The connection application may refine the connection configuration based on the current performance of router 111. The connection application transfers the connection configuration to the network application. The network application exchanges user data with network slices 132 over network connections using data throughputs and data latencies that are indicated by the connection configuration. For example, the connection configuration may correlate throughputs for individual UE connections to the total router throughput to dynamically manage throughput when router backhaul quality varies.

In some examples, router application 118 comprises a network application executing in network version of container 114, and router application 119 comprises a slice application executing in a slice version of container 115. The slice application in container 115 receives prioritized slice identifiers for UEs 101-103 from network control 131 over access node 120 and the network application in container 114. The slice application transfers the prioritized slice IDs for UEs 101-103 to the network application. The slice application may refine the slice configuration based on the current performance of router 111. The network application prioritizes the exchange of user data with network slices 132 over the network connections based on the prioritized slice IDs. For example, the slice configuration may correlate slice priorities to total router throughput, and some slice IDs may receive a higher priority when router throughput falls while other slice IDs receive a higher priority when router throughput bursts.

Advantageously, data router 110 effectively supports network slices 132. Moreover, data router 110 efficiently enables network control 131 to control router operations to support wireless network slices 132.

UEs 101-103 communicate over network connections that are shown in bold and that traverse data router 110, access node 120, and network slices 132. The network connections use metallic wiring, glass fibers, radio channels, or some other communication media. The network connections use technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, IEEE 802.3 (ETHERNET), Internet Protocol (IP), Time Division Multiplex (TDM), Data Over Cable System Interface Specification (DOCSIS), General Packet Radio Service Transfer Protocol (GTP), virtual switching, inter-processor communication, bus interfaces, and/or some other data communication protocols. UEs 101-103, data router 110, access node 120, network control 131, and network slices 132 comprise microprocessors, software, memories, transceivers, bus circuitry, and the like. UEs 101-103, data router 110, and access node 120 may include radios, although wireless communications are not required for data router 110. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
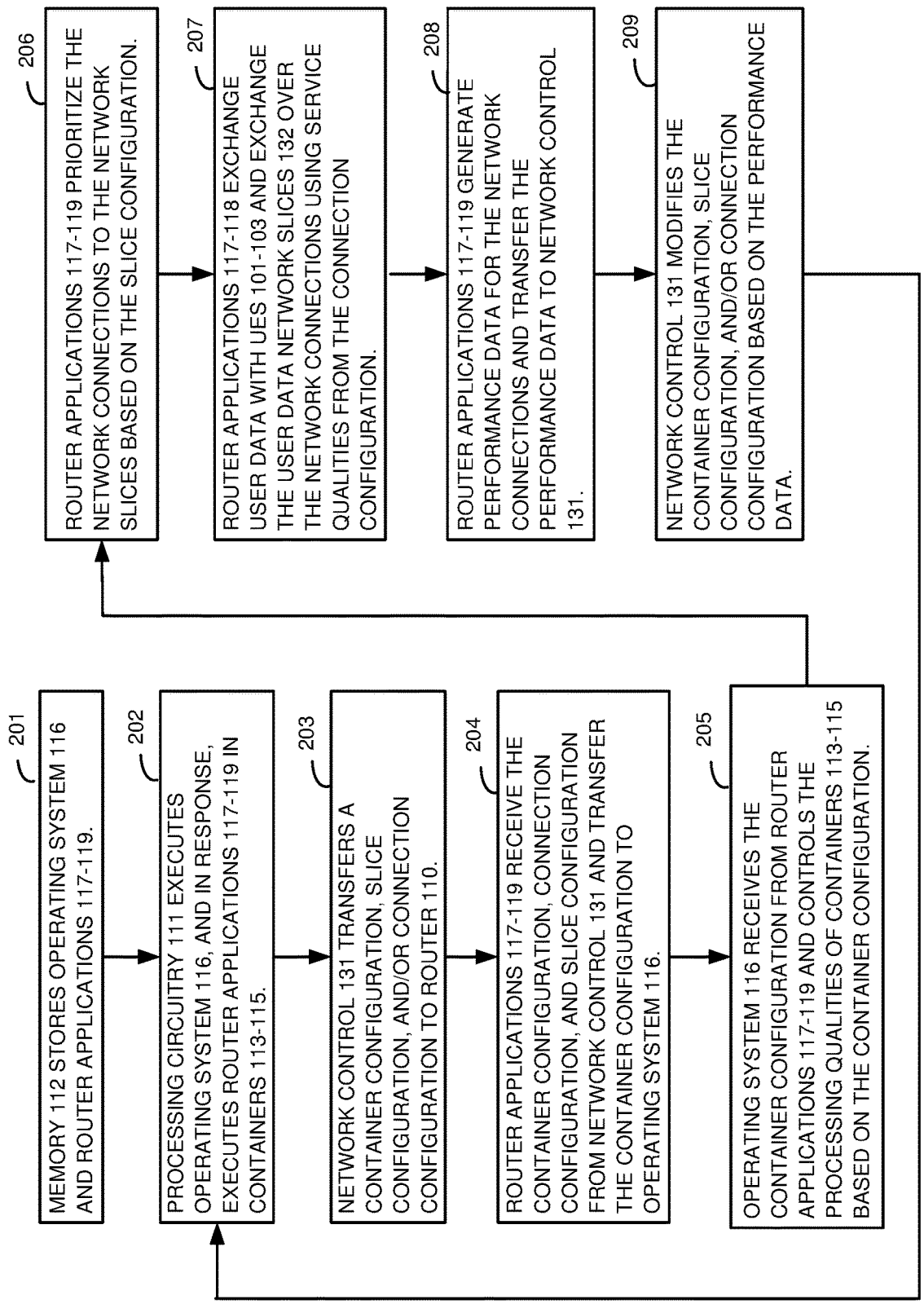
FIG. 2 illustrates an exemplary operation of the wireless communication network that has the data router to serve the UEs over the network connections to the network slices.

FIG. 2 illustrates an exemplary operation of wireless communication network 100 that has data router 110 to serve UEs 101-103 over the network connections to network slices 132. The operation may differ in other examples. Memory 112 stores operating system 116 and router applications 117-119 (201). Processing circuitry 111 executes operating system 116 to form containers 113-115 which execute router applications 117-119 (202). Network control 131 transfers a container configuration, a connection configuration, and a slice configuration to router 110 over access node 120 (203). Router applications 117-119 receive the container configuration, connection configuration, and slice configuration over access node 120 and transfer the container configuration to operating system 116 (204). Operating system 116 receives the container configuration from router application 119 and controls the processing qualities of containers 113-115 based on the container configuration (205). Router applications 117-119 prioritize the network connections to network slices 132 based on the slice configuration (206). Router applications 117-118 exchange user data with UEs 101-103 (207). Router applications 117-118 exchange the user data with network slices 132 over the network connections and access node 120 using service qualities from the connection configuration (207). Router applications 117-119 generate performance information for the network connections and transfer the performance information to network control 131 over access node 120 (208). Network control 131 modifies the container configuration, slice configuration, and/or connection configuration based on the performance data (209). The operation repeats (202).

Figure 3:
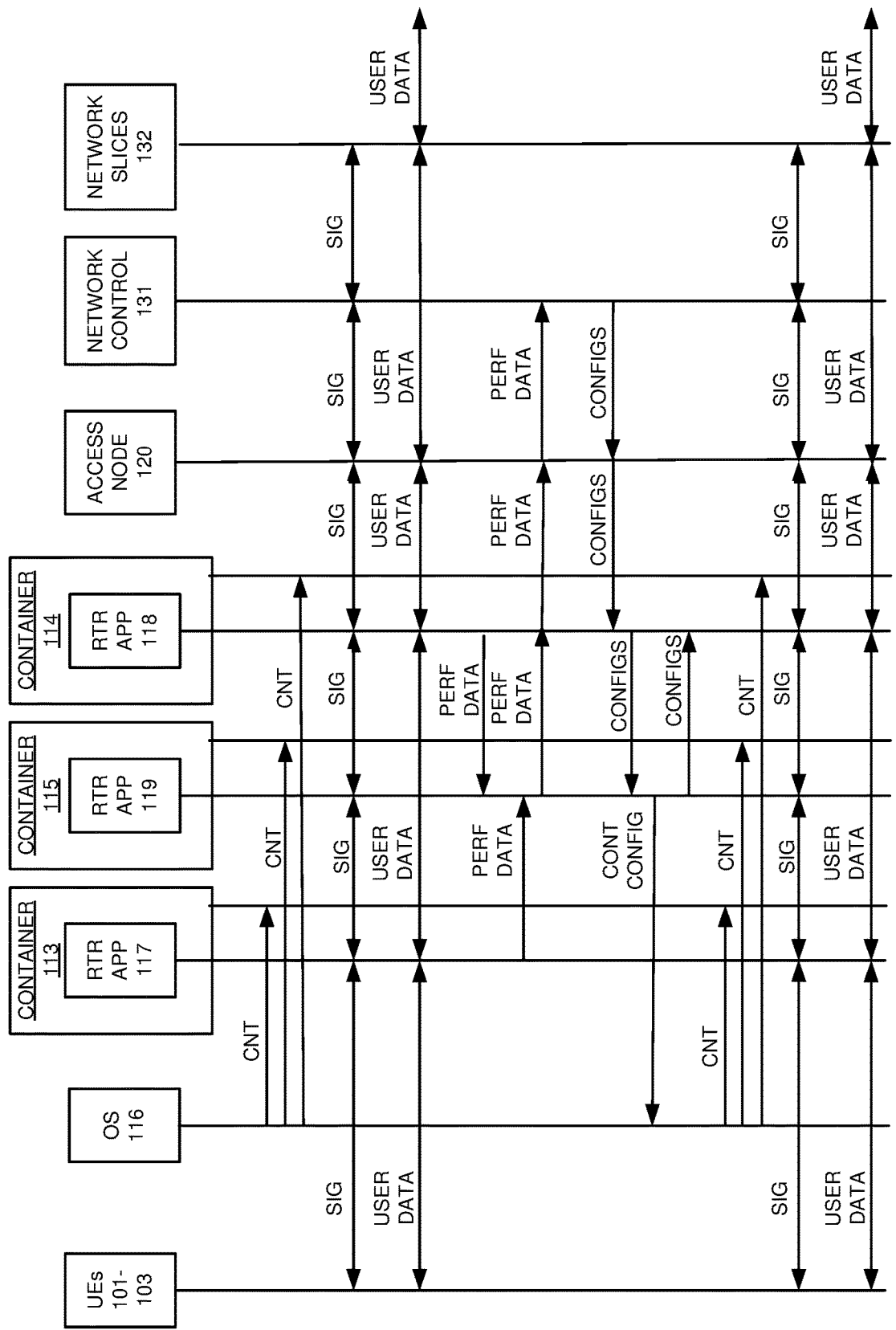
FIG. 3 illustrates an exemplary operation of the wireless communication network that has the data router to serve the UEs over the network connections to the network slices.

FIG. 3 illustrates an exemplary operation of wireless communication network 100 that has data router 110 to serve UEs 101-103 over the network connections to network slices 132. The operation may differ in other examples. Operating system 116 exerts control (CNT) over containers 113-115 based on a container configuration. Router applications 118-119 exchange signaling (SIG) to establish router connectivity to slices 132. Router application 119 and network control 131 exchange signaling over access node 120 to establish the router connectivity to slices 132. Network control 131 and network slices 132 exchange signaling to establish the router connectivity to slices 132. UEs 101-103 and router application 117 exchange signaling to establish router connectivity to UEs 101-103. Router applications 117 and 119 exchange signaling to initiate UE slice selection. Router application 117 and UEs 101-103 exchange signaling to perform UE slice selection. Router applications 118-119 exchange signaling to establish network connections for the selected slices. Router application 118 and network control 131 exchange signaling over access node 120 to establish network connections between UEs 101-103 and network slices 132 per the UE slice requests. UEs 101-103 exchange user data with external systems over router applications 117-118, access node 120, and network slices 132 per the UE slice requests.

Router applications 117-118 generate performance data for the user data exchanges like throughput, latency, and error rate on a per-UE, per-slice, and per-connection basis. Router applications 117-118 transfer the performance data to router application 119 which transfers the performance data to network control 131 over application 118 and access node 120. Network control 131 processes the performance data to generate configurations for router 110 to control containers 113-115, network connections, and network slices 132. Network control 131 transfers the configurations to router application 119 over access node 120 and application 118. Router application 119 transfers the container configuration to operating system 116. Router application 119 refines and transfers the slice and connection configurations to router application 118.

Operating system 116 exerts control over containers 113-115 based on the modified container configuration. For example, operating system 116 may increase CPU and RAM resources for a container that supports a work-related services during working hours while reducing CPU and RAM resources for containers that support entertainment-related services during working hours. Operating system 116 may eliminate CPU and RAM resources for a container that supports a redundant service. Router applications 118-119 and network control 131 exchange signaling to modify UE connectivity to network slices 132 based on modified slice and connection configurations. Router application 117 and UEs 101-103 exchange signaling to perform additional slice selection/deselection based on modified slice configurations. UEs 101-103 exchange user data with external systems over router applications 117-118, access node 120, and network slices 132 per the UE slice requests and the configurations for container, slice, and connection.

Figure 4:
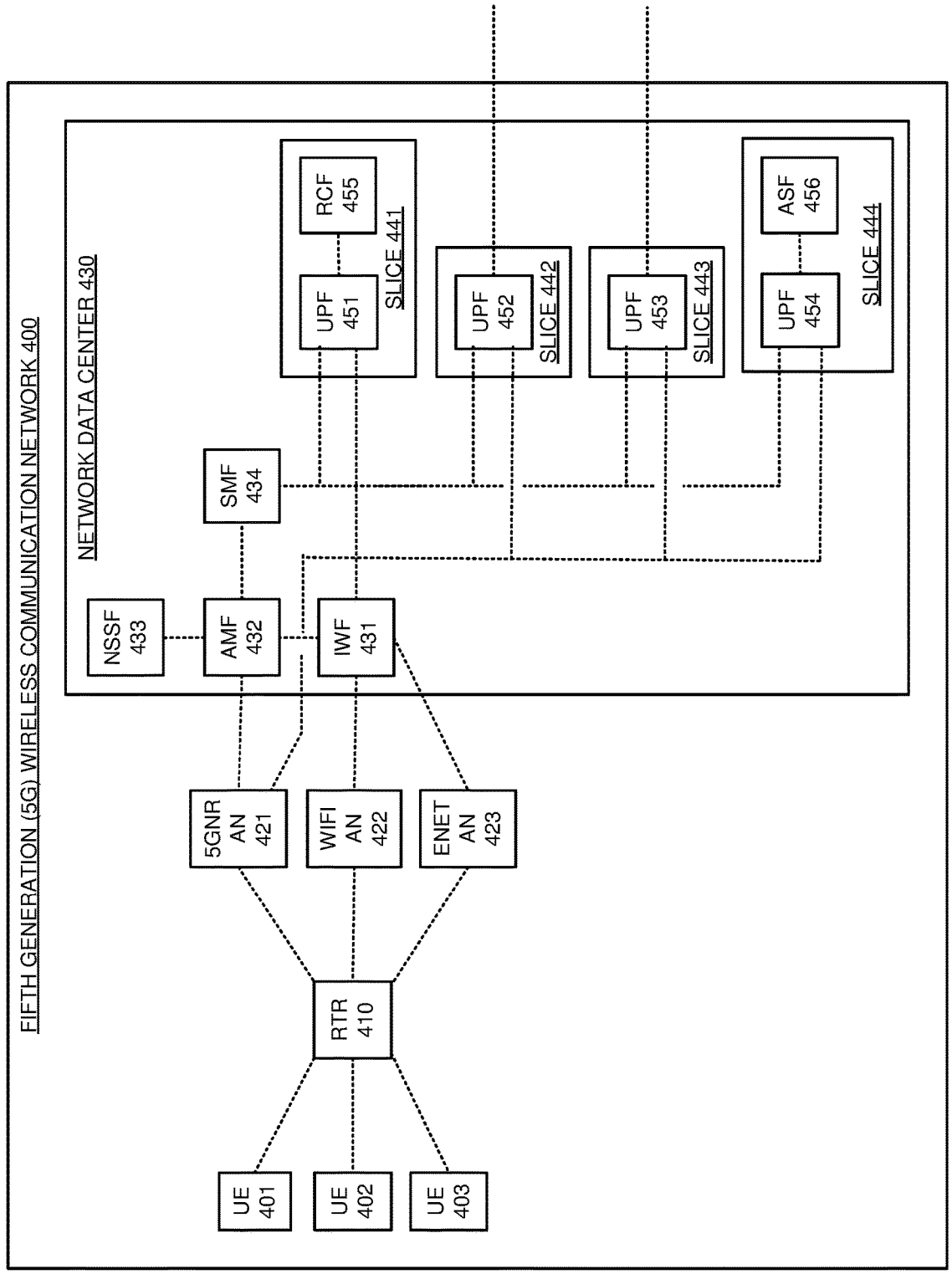
FIG. 4 illustrates an exemplary Fifth Generation (5G) wireless communication network that has a wireless router to serve UEs over network connections to network slices.

FIG. 4 illustrates an exemplary Fifth Generation (5G) wireless communication network 400 that has wireless router 410 to serve UEs 401-403 over network connections to network slices 442-444. 5G wireless communication network 400 comprises an example of wireless communication network 100, although network 100 may differ. 5G wireless communication network 400 comprises: UEs 401-403, wireless router (RTR) 410, 5GNR Access Node (AN) 421, WIFI AN 422, Ethernet (ENET) AN 423, and network data center 430. Network data center 430 comprises non-Third Generation Partnership Project (non-3GPP) Interworking Function (IWF) 431, Access and Mobility Management Function (AMF) 432, Network Slice Selection Function (NSSF) 433, Session Management Function (SMF) 434, and wireless network slices 441-444. Wireless network slice 441 comprises User Plane Function (UPF) 451 and Router Control Function (RCF) 455. Wireless network slice 442 comprises UPF 452. Wireless network slice 443 comprises UPF 453. Wireless network slice 444 comprises UPF 453 and Application Server Function (ASF) 456.

Router 410 registers with AMF 432 over at least one of: 5GNR AN 421, WIFI AN 422-IWF 431, and ENET AN 423-IWF 431. Router 410 reports a router capability for slice 441. AMF 432 and NSSF 433 interact to authorize slice 441 for router 410. AMF 432 signals SMF 434 to connect router 410 to slice 441, and SMF 434 configures UPF 451 to serve router 410. AMF 432 signals 5GNR AN 421 and/or IWF 431 to connect router 410 to UPF 451. Router 410 registers with RCF 455 over UPF 451. RCF 455 transfers a container configuration and slice information to router 410. Router 410 executes router applications in containers based on the container configuration from RCF 455. For example, RCF 455 may increase CPU and RAM resources for a container that supports a work-related services during working hours while reducing CPU and RAM resources for containers that support entertainment-related services during working hours. RCF 455 may eliminate CPU and RAM resources for a container that supports a redundant service.

UE 401 connects to router 410. Router 410 transfers the slice information from RCF 455 to UE 401. UE 401 requests slice 444. Router 410 reports a UE capability for slice 444. AMF 432 and NSSF 433 interact to authorize slice 444 for UE 401 over router 410. AMF 432 signals SMF 434 to connect router 410 to slice 444, and SMF 434 configures UPF 454 to serve router 410 and UE 401. AMF 432 signals 5GNR AN 421 and/or IWF 431 to connect router 410 to UPF 454 for UE 401. UE 401 and ASF 456 communicate to deliver a data service like augmented-reality.

Router 410 monitors data communication performance and transfers corresponding performance data to RCF 455. RCF 455 processes the performance data to determine a container configuration, slice configuration and connection configuration. The container configuration indicates computer resource levels for containers (and their router applications) based on the current performance and UE slice usage. The slice configuration indicates slice priorities for slices 441 and 444 based on the current performance and UE slice usage. The connection configuration indicates router throughputs between router 410 and slice 441 and between UE 401 and slice 444. Router 410 executes the router applications in the containers based on the container configuration from RCF 455. Router 410 prioritizes slices 441 and 444 based on the slice configuration by serving the higher-priority slice before serving the lower-priority slice. Router 410 exchanges data for slice 444 with UE 401. Router 410 exchanges data for slices 441 and 444 with one or more of ANs 421-423 based on the connection throughputs from the connection configuration.

UE 402 connects to router 410. Router 410 transfers the slice information to UE 402. UE 402 requests slices 442 and 444. Router 410 reports a UE capability for slices 442 and 444. AMF 432 and NSSF 433 authorize slices 442 and 444 for UE 402 over router 410. AMF 432 signals SMF 434 to connect router 410 to slices 442 and 444, and SMF 434 configures UPFs 452 and 454 to serve router 410 and UE 402. AMF 432 signals 5GNR AN 421 and/or IWF 431 to connect router 410 to UPFs 452 and 454 for UE 402. UE 402 and UPF 452 communicate to deliver the data service from slice 442. UE 402 and ASF 456 communicate to deliver the data service from slice 444.

Router 410 monitors data communication performance and transfers corresponding performance data to RCF 455. RCF 455 processes the performance data to determine a container configuration, slice configuration, and connection configuration. The container configuration indicates computer resource levels for router applications based on the current performance and UE slice usage. The slice configuration indicates slice priorities for slices 441, 442, and 444 based on the current performance and UE slice usage. The connection configuration indicates router throughputs between router 410 and slice 441, UE 401 and slice 444, UE 402 and slice 442, and UE 402 and slice 444. The connection configuration indicates a connection priority for the two slice 444 connections for UEs 401-402 to control which UE is served with the higher priority (served first) for slice 444. Router 410 executes the router applications in the containers based on the container configuration from RCF 455. Router 410 prioritizes slices 441, 442, and 444 based on the slice configuration by serving the higher-priority slices before serving the lower-priority slices. Router 410 exchanges data for slice 444 with UEs 401-402. Router 410 exchanges data for slices 441, 442, and 444 with one or more of ANs 421-423 based on the slice priorities, connection throughputs, and connection priorities from the slice and connection configurations.

UE 403 connects to router 410. For UE 403, router 410 selects slices 443 and 444 for UE 403 in response to the UE 403 connection. Router 410 reports a UE capability for slices 443 and 444. AMF 432 and NSSF 433 authorize slices 443 and 444 for UE 403 over router 410. AMF 432 signals SMF 434 to connect router 410 to slices 443 and 444, and SMF 434 configures UPFs 453-454 to serve router 410 and UE 403. AMF 432 signals 5GNR AN 421 and/or IWF 431 to connect router 410 to UPFs 453-454 for UE 403. UE 403 and UPF 453 communicate to deliver the data service from slice 443. UE 403 and ASF 456 communicate to deliver the data service from slice 444.

Router 410 monitors data communication performance and transfers corresponding performance data to RCF 455. RCF 455 processes the performance data to modify the container configuration, slice configuration, and/or connection configuration. The container configuration may be used to allocate router resources among UEs 401-403 and slices 441-444. The slice configuration indicates slice priorities for slices 441-444 based on the current performance and UE slice usage. The connection configuration indicates router throughputs between router 410 and slice 441, UE 401 and slice 444, UE 402 and slice 442, UE 402 and slice 444, UE 403 and slice 443, and UE 403 and slice 444. The connection configuration indicates connection priority for the three connections for UEs 401-403 in slice 444 to control which UE is served first, second, and third. Router 410 executes the router applications in the containers based on the container configuration from RCF 455. Router 410 prioritizes slices 441-444 based on the slice configuration. Router 410 exchanges data for slice 444 with UEs 401-403. Router 410 exchanges data for slices 441-444 with one or more of ANs 421-423 based on the slice priorities, connection throughputs, and connection priorities from the slice and connection configurations.

When the performance of a given slice or UE connection falls, RCF 455 may allocate more router resources to the containers that support the slice or connection. Alternatively, RCF 455 may deallocate router resources from containers that support a poorly performing slice or connection. When new UEs attach and use slices, RCF 455 may allocate more router resources to the containers that support the heavily used slices or connections. RCF 455 may deallocate router resources away from containers that support underused slices or connections. In some cases, UEs 401-403 interact directly with AMF 432 over router 410 to perform slice selection. Router 410 reports these UEs and slices to RCF 455. RCF 455 processes this slice information to determine the container, slice, and connections configurations.

Figure 5:
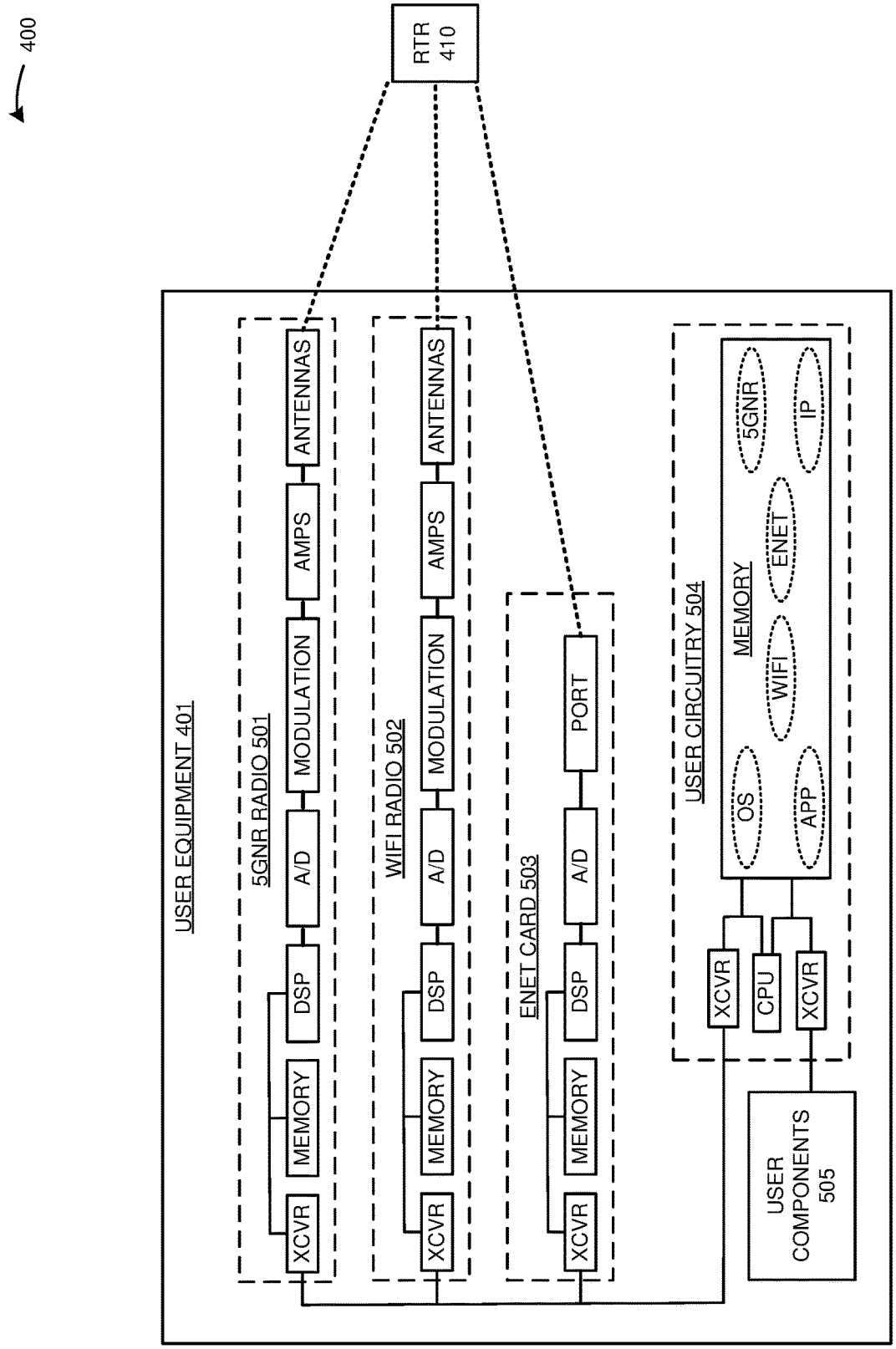
FIG. 5 illustrates an exemplary UE in the 5G wireless communication network.

FIG. 5 illustrates exemplary UE 401 in 5G wireless communication network 400. UE 401 comprises an example of UEs 101-102 and 402-403, although these UEs may differ. UE 401 comprises 5GNR radio 501, WIFI radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, ENET, 5GNR, and IP. The antennas in 5GNR radio 501 are wirelessly coupled to router 410 over a 5GNR link. The antennas in WIFI radio 502 are wirelessly coupled to router 410 over a WIFI link. The port in ENET card 503 is wireline coupled to router 410 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with router 410 over radios 501-502 and/or card 503.

In some examples, some of the 5GNR, WIFI, and ENET components could be omitted. For example, the 5GNR and ENET portions could be omitted to form a WIFI-only UE. The 5GNR and WIFI portions could be omitted to form an ENET-only UE. The WIFI and ENET portions could be omitted to form a 5GNR-only UE. Other device combinations could be used like 5GNR/WIFI, 5GNR/ENET, and WIFI/ENET.

Figure 6:
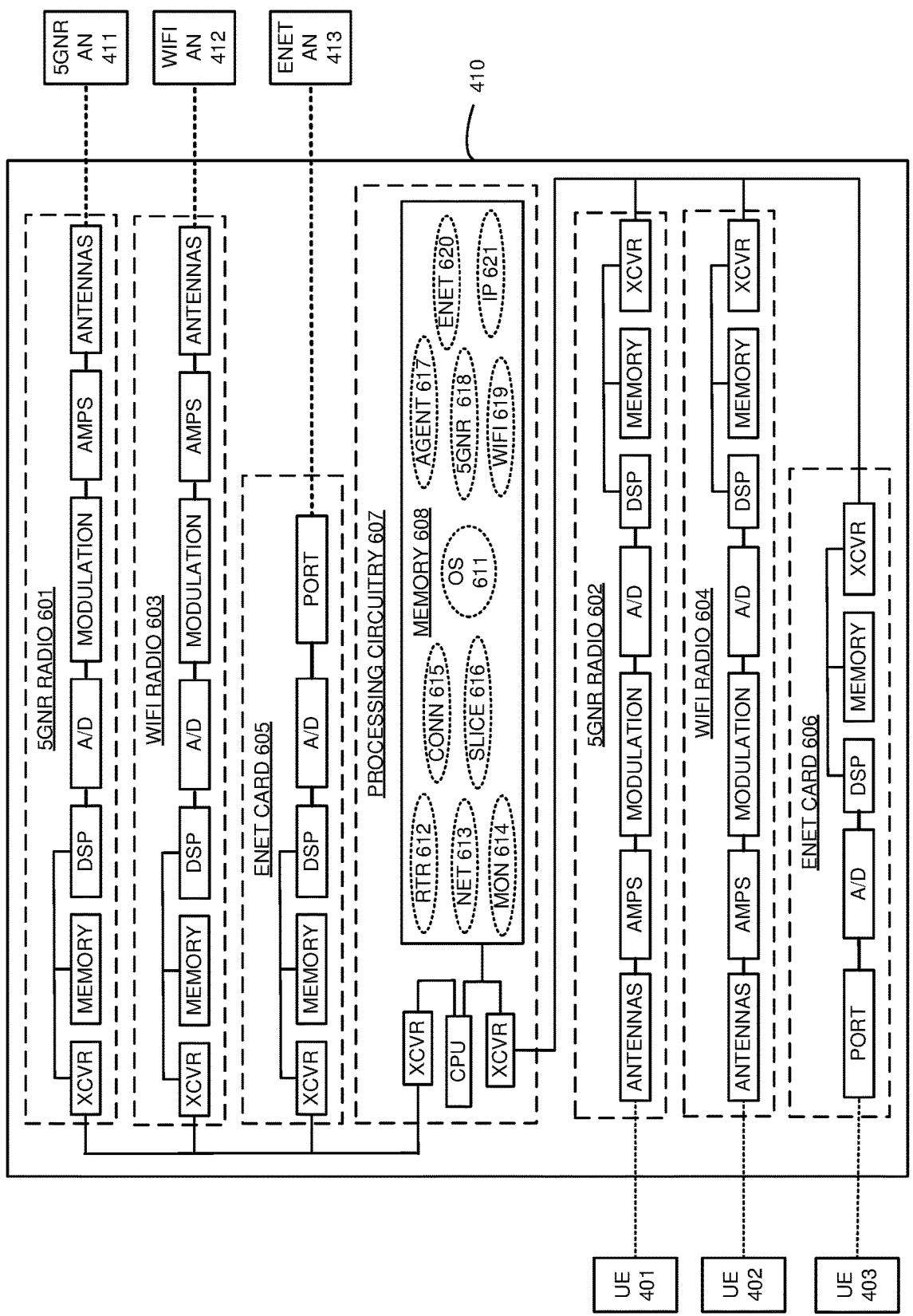
FIG. 6 illustrates an exemplary wireless router in the 5G wireless communication network.

FIG. 6 illustrates exemplary wireless router 410 in 5G wireless communication network 400. Wireless router 410 comprises an example of data router 110, although router 110 may differ. Wireless router 410 comprises 5GNR radios 601-602, WIFI radios 603-604, ENET cards 605-606, and processing circuitry 607. Radios 601-604 comprise antennas, amplifiers, filters, modulation, analog-to-digital interfaces, DSP, memory, and transceivers that are coupled over bus circuitry. Ethernet cards 605-606 comprise ports, analog-to-digital interfaces, DSP, memory, and transceivers that are coupled over bus circuitry. Processing circuitry 607 comprises memory 608, CPU, and transceivers that are coupled over bus circuitry. Memory 608 stores operating system 611, router application 612, network application 613, monitor application 614, connection application 615, slice application 616, agent application 617, 5GNR application 618, WIFI application 619, ENET application 620, and IP application 621. The antennas in 5GNR radio 601 are wirelessly coupled to 5GNR AN 411 over a 5GNR link. The antennas in 5GNR radio 602 are wirelessly coupled to UE 401 over a 5GNR link. The antennas in WIFI radio 603 are wirelessly coupled to WIFI AN 412 over a WIFI link. The antennas in WIFI radio 604 are wirelessly coupled to UE 402 over a WIFI link. The port in ENET card 605 is wireline coupled to ENET AN 413 over an ENET link. The port in ENET card 606 is wireline coupled to UE 403 over an ENET link. Transceivers in radios 601-604 and cards 605-606 are coupled to transceivers in processing circuitry 607.

The CPU in processing circuitry 607 retrieves and executes operating system 611 and applications 612-621 to exchange network signaling and user data with ANs 411-413. In particular, operating system 611 directs processing circuitry 608 to execute applications 612-621 in containers based on a container configuration. The container configuration indicates CPU resources, memory resources, and transceiver resources for the containers—and their applications. Connection application 615 controls quality-of-service and priority for the data connections that are served by network application 613 to UEs 401-403. Slice application 616 controls slice information and priorities for the slices that are served to UEs 401-403.

In some examples, some of the 5GNR, WIFI, and ENET components could be omitted. For example, the 5GNR portion for UE access could be omitted, so router 410 only serves WIFI and ENET access to UEs. The WIFI portion for network access could be omitted, so router 410 only uses 5GNR and ENET to access the network. Various combinations could be used for UE access and network access—including the addition of other communication interfaces like Bluetooth or LP-WAN.

Figure 7:
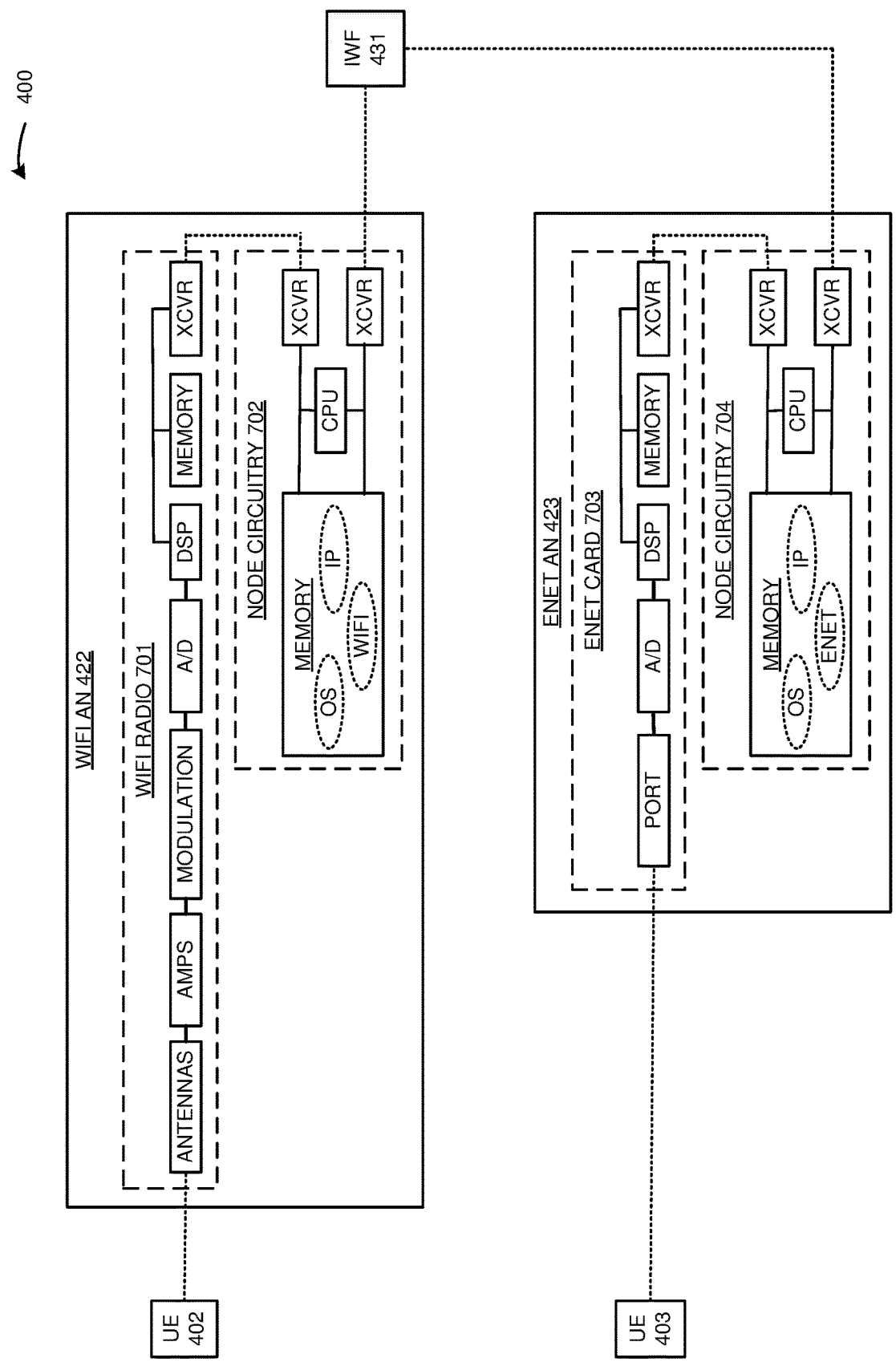
FIG. 7 illustrates exemplary non-3GPP access nodes in the 5G wireless communication network.

FIG. 7 illustrates exemplary non-3GPP access nodes 422-423 in 5G wireless communication network 400. Non-3GPP access nodes 422-423 comprise examples of access node 120, although node 120 may differ. WIFI AN 422 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and WIFI. The antennas in WIFI radio 701 are wirelessly coupled to UE 402 over a WIFI link. Transceivers in WIFI radio 701 are coupled to transceivers in node circuitry 702. Transceivers in node circuitry 702 are coupled to transceivers in IWF 431. The CPU in node circuitry 702 executes the operating system and network applications to exchange network signaling and user data with UE 402 and with IWF 431.

ENET AN 412 comprises ENET card 703 and node circuitry 704. ENET card 703 comprises ports, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for IP and ENET. The ports in ENET card 703 are wireline coupled to UE 403 over an ENET link. Transceivers in ENET card 703 are coupled to transceivers in node circuitry 704. Transceivers in node circuitry 704 are coupled to transceivers in IWF 431. The CPU in node circuitry 704 executes the operating system and network applications to exchange network signaling and user data with UE 403 and with IWF 431.

Figure 8:
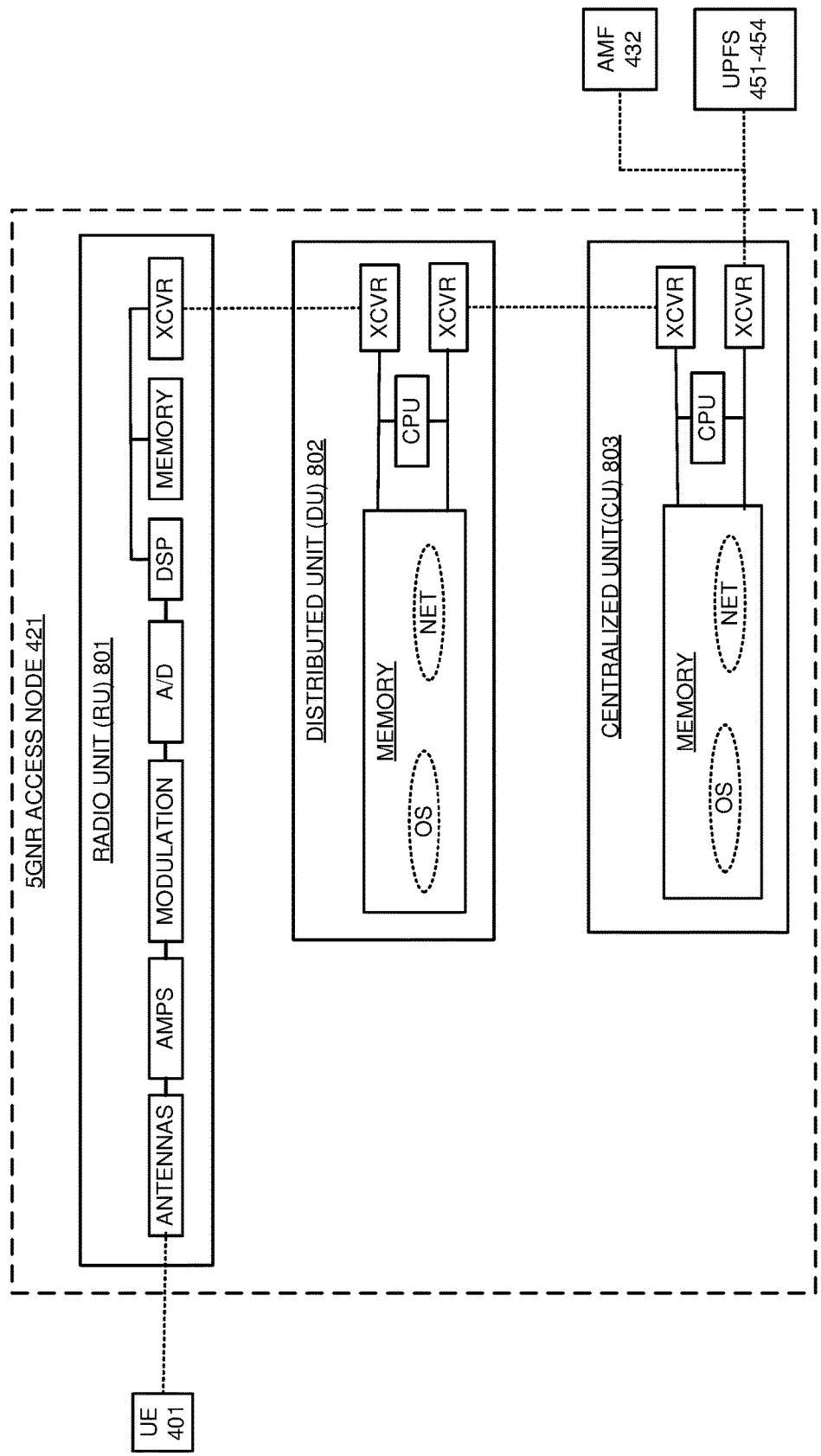
FIG. 8 illustrates an exemplary 5G New Radio (5GNR) access node in the 5G wireless communication network.

FIG. 8 illustrates exemplary 5G New Radio (5GNR) access node 421 in 5G wireless communication network 400. 5GNR access node 421 comprises an example of access node 120, although node 120 may differ. 5GNR access node 421 comprises Radio Unit (RU) 801, Distributed Unit (DU) 802, and Centralized Unit (CU) 803. RU 801 comprises 5GNR antennas, amplifiers, filters, modulation, analog-to-digital interfaces, DSP, memory, radio applications, and transceivers that are coupled over bus circuitry. DU 802 comprises memory, CPU, user interfaces and components, and transceivers that are coupled over bus circuitry. The memory in DU 802 stores operating system 804 and network applications for physical layer, media access control, and radio link control. CU 803 comprises memory, CPU, user interfaces and components, and transceivers that are coupled over bus circuitry. The memory in CU 803 stores an operating system and network applications for packet data convergence protocol, service data adaption protocol, and radio resource control. The antennas in RU 801 are wirelessly coupled to UE 401 over 5GNR links. Transceivers in RU 801 are coupled to transceivers in DU 802. Transceivers in DU 802 are coupled to transceivers in CU 803. Transceivers in CU 803 are coupled to AMF 432 and UPFs 451-454. The DSP and CPU in RU 801, DU 802, and CU 803 execute radio applications, operating systems, and network applications to exchange network signaling and user data with UE 401, AMF 432, and UPFs 451-454.

Figure 9:
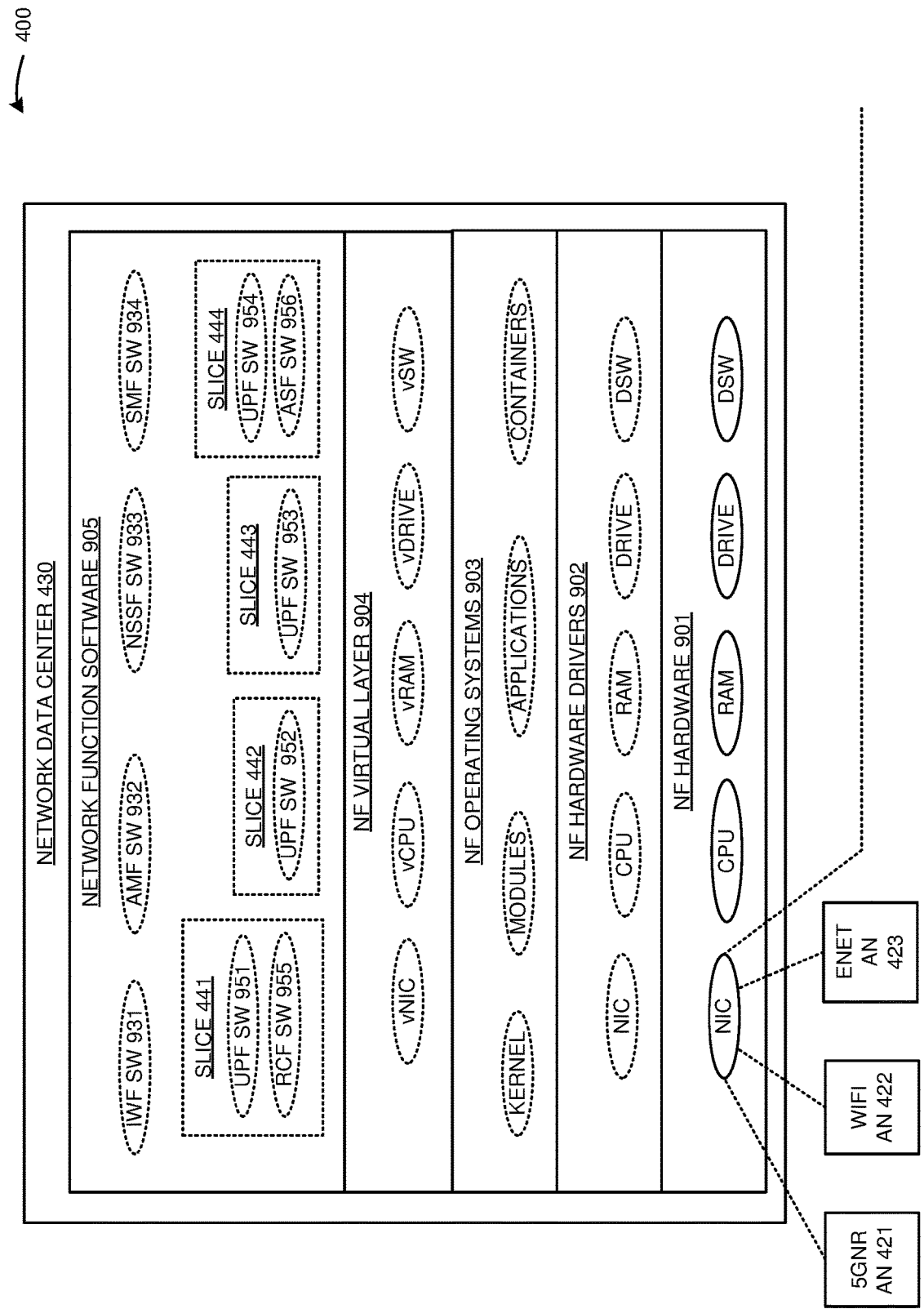
FIG. 9 illustrates an exemplary network data center in the 5G wireless communication network.

FIG. 9 illustrates exemplary network data center 430 in 5G wireless communication network 400. Network data center 430 comprises an example of network control 131 and network slices 132, although control 131 and slices 132 may differ. Network data center 430 comprises Network Function (NF) hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises IWF SW 931, AMF SW 932, NSSF SW 933, SMF SW 934, slices 441-444. Slice 441 comprises UPF SW 951 and RCF SW 955. Slice 442 comprises UPF SW 952. Slice 443 comprises UPF SW 953. Slice 444 comprises UPF SW 954 and ASF SW 956. Other NFs like Authentication Server Function (AUSF) and Network Repository Function (NRF) are typically present but are omitted for clarity. Network data center 430 may be located at a single site or be distributed across multiple geographic locations. The NIC in NF hardware 901 are coupled to 5GNR AN 421, WIFI AN 422, ENET AN 423, and external systems. NF hardware 901 executes NF hardware drivers 902, NF operating systems 903, NF virtual layer 904, and NFs 905 to form and operate IWF 431, AMF 432, NSSF 433, SMF 434, and slices 441-444.

Figure 10:
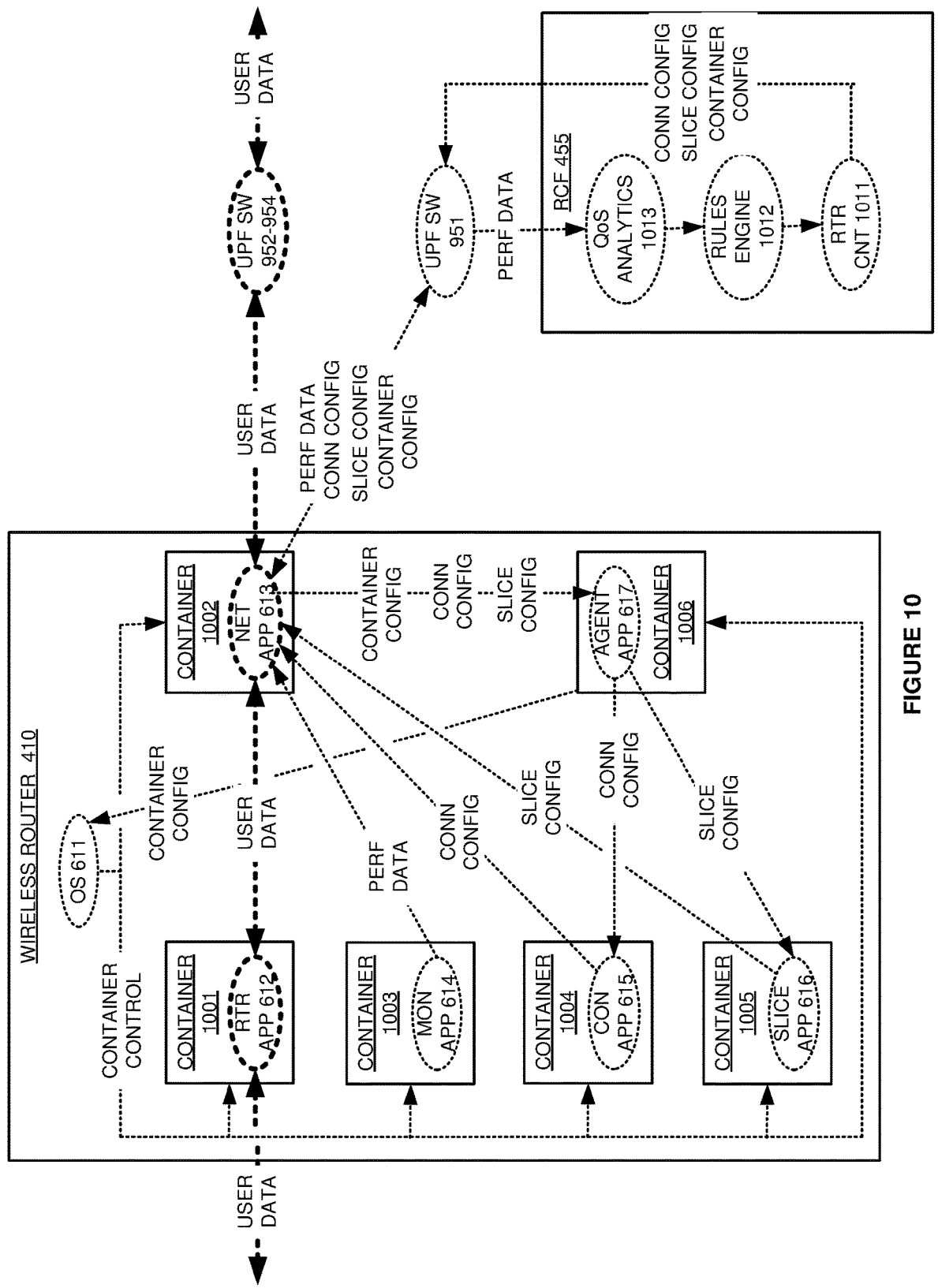
FIG. 10 illustrates an exemplary wireless router and Router Control Function (RCF) in the 5G wireless communication network.

FIG. 10 illustrates wireless router 410 and Router Control Function (RCF) 455 in 5G wireless communication network 400. RCF 455 comprises router control 1011, rules engine 1012, and QoS analytics 1013. Wireless router 410 comprises operating system 611 and containers 1001-1006. Container 1001 executes router application 612 responsive to operating system 611. Container 1002 executes network application 613 responsive to operating system 611. Container 1003 executes monitor application 614 responsive to operating system 611. Container 1004 executes connection application 615 responsive to operating system 611. Container 1005 executes slice application 616 responsive to operating system 611. Container 1006 executes agent application 617 responsive to operating system 611.

Router application 612 exchanges user data with UEs 401-403 (not shown on FIG. 10). Router application 612 exchanges the user data with network application 613. Network application 613 exchanges the user data with UPF SW 952-954 for slices 442-444. Monitor application 614 determines performance information—typically from applications 612-613—that indicates data throughput, latency, and the like for the UE connections and slices. Monitor application 614 transfers the performance data to QoS analytics 1013 over network application 613 and UPF SW 951. QoS analytics 1013 formats and processes the performance data and transfers the analytic results to rules engine 1012. Rules engine 1012 processes the analytic results to generate a new container configuration, slice configuration, and connection configuration for router 410. For example, rules engine 1012 boosts resources, priorities, and throughputs for some slices while reducing resources, priorities, and throughputs for other slices. Rules engine 1012 transfers the new container configuration, slice configuration, and connection configuration for router 410 to router control 1011. Router control 1011 transfers the new container configuration, slice configuration, and connection configuration to agent application 617 over UPF SW 951 and network application 613.

Agent application 617 transfers the new container configuration to operating system 611. Operating system 611 controls the computing resources of containers 1001-1006 based on the new container configuration. For example, applications 612-613 may get a resource boost for a large uplink burst of user data. To boost a slice in router 410, RCF 455 allocates container resources to the applications that support the high-priority slice connections.

Agent application 617 transfers the new slice configuration to slice application 616. Prior to receiving the slice configuration, slice application 616 interacts with UEs 401-403 over router application 612 to offer and accept requests for network slices 442-444. Slice application 616 also interacts with AMF 432 over network application 613 to get the slice information and establish slices 442-444. Slice application 616 transfers the slice configuration to network application 613. Network application 613 may new slice connections based on the slice configuration. Network application 613 prioritizes the active slice connection based on the slice configuration. To boost a slice in router 410, RCF 455 allocates slice priority to the connections of the slice.

Agent application 617 transfers the new connection configuration to connection application 615. Connection application 615 transfers the connection configuration to network application 613. Network application 613 applies data throughputs and latencies to individual connections based on the connection configuration. Network application 613 may prioritize connections in the same slice based on the connection configuration. To boost a slice in router 410, RCF 455 allocates connection quality and priority to the connections for the slice.

Figure 11:
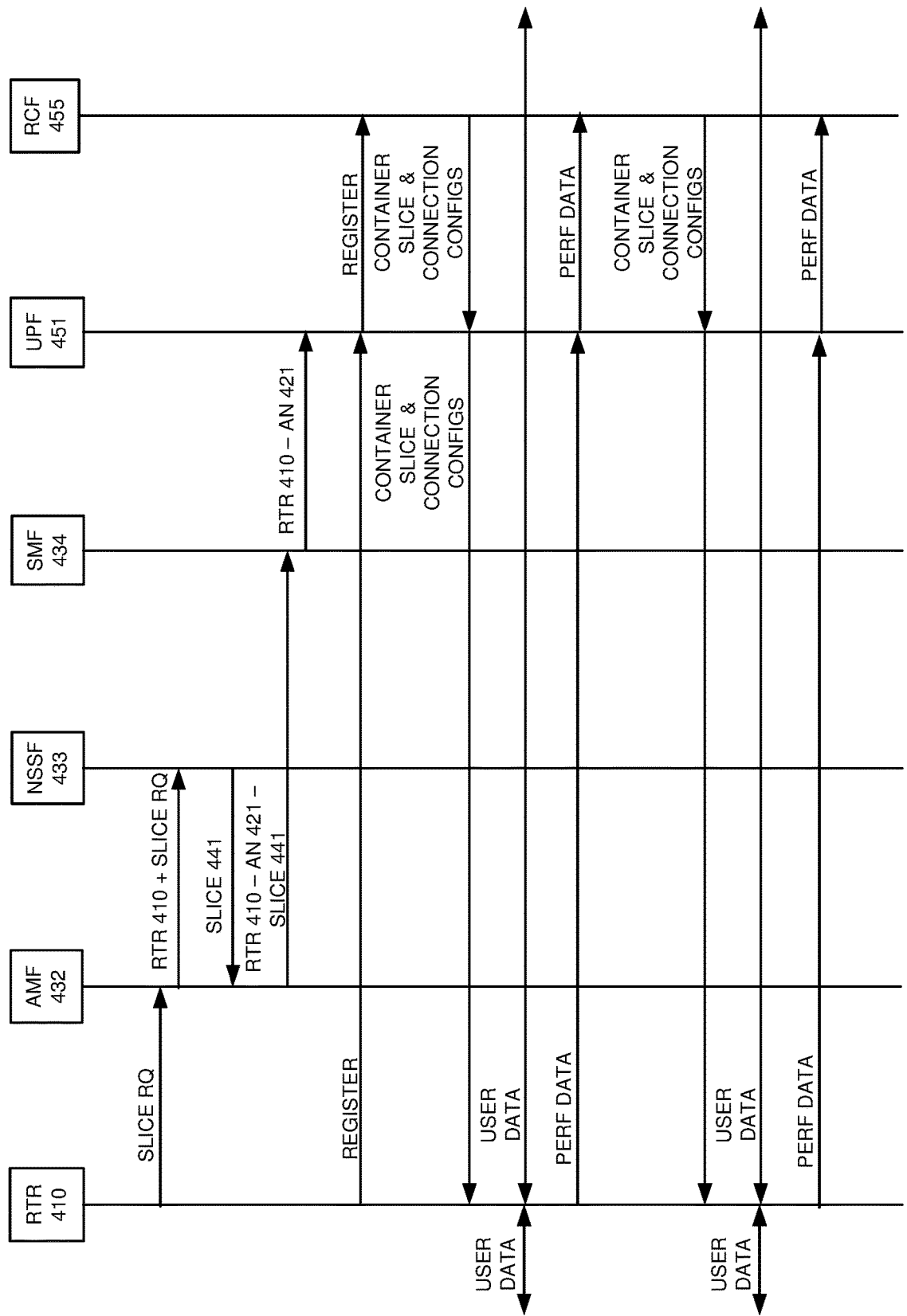
FIG. 11 illustrates an exemplary operation of the 5G wireless communication network that has the wireless router to serve the UEs over the network connections to the network slices.

FIG. 11 illustrates an exemplary operation of the 5G wireless communication network that 400 has wireless router 410 to serve UEs 401-403 over the network connections to network slices 442-444. The operation may differ in other examples. Router 410 transfers a slice request (RQ) for router slice 441 to AMF 432 over 5GNR AN 421 (AN 421 is not shown on FIG. 11). AMF 432 and NSSF 433 interact to authorize slice 441 for router 410. AMF 431 signals SMF 434 to serve router 410 over slice 441. SMF 434 directs UPF 451 in slice 441 to serve router 410 over 5GNR AN 421. Router 410 registers with RCF 455 over AN 421 and UPF 451. RCF 455 transfers a default information and configurations for container, slice, and connection to router 410 over AN 421 and UPF 451. Router 410 implements the information and configurations for container, slice, and connection to establish connections to slices 442-444 for UEs 401-403. Router 410 exchanges user data between UEs 401-403 and slices 442-444 over the connections.

Router 410 transfers performance data for the connections to RCF 455 over 5GNR AN 421 and UPF 451. RCF 455 processes the performance information to generate and transfer new configurations for container, slice, and connection to router 410 over AN 421 and UPF 451. Router 410 implements the new configurations for container, slice, and connection to possibly modify the connections to slices 442-444 for UEs 401-403. Router 410 exchanges user data between UEs 401-403 and slices 442-444 over the connections. Router 410 transfers more performance data for the connections to RCF 455 over 5GNR AN 421 and UPF 451 and the process repeats.

Figure 12:
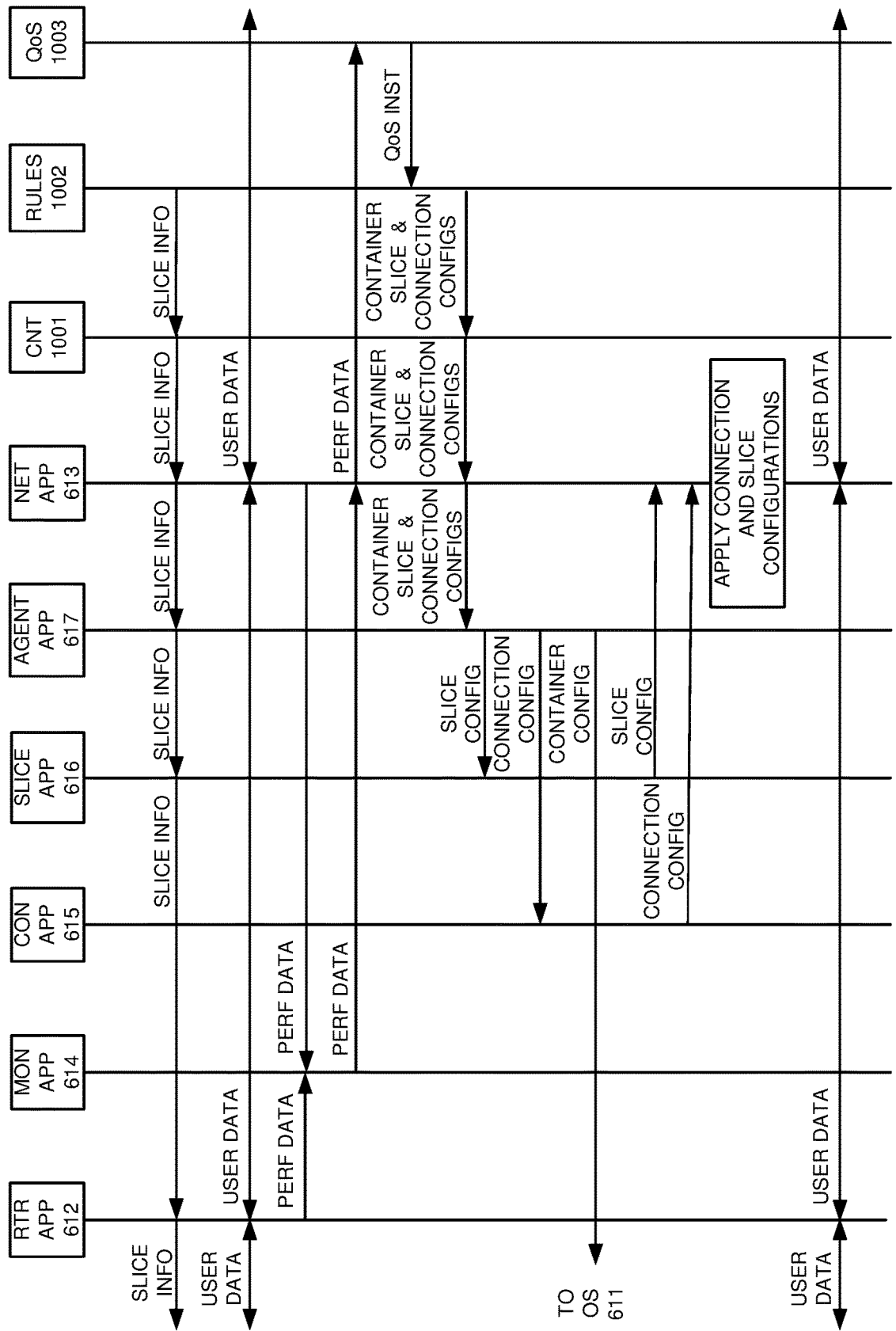
FIG. 12 illustrates an exemplary operation of the 5G wireless communication network that has the wireless router to serve the UEs over the network connections to the network slices.

FIG. 12 illustrates an exemplary operation of the 5G wireless communication network that 400 has wireless router 410 to serve UEs 401-403 over the network connections to network slices 442-444. The operation may differ in other examples. Rules engine 1002 transfers slice information to slice application 616 over controller 1001 and applications 613 and 617. Slice application transfers the slice information to UEs 401-403 (not shown on FIG. 12). After establishing slice connections, router application 612 exchanges user data with UEs 401-403 and exchanges the user data with network application 613. Network application 613 exchanges the user data with slices 442-444 (not shown on FIG. 12) based on the slice and connection configurations.

Router application 612 and network application 613 transfer performance data like throughput and latency for the UE connections to slices 442-444 to monitor application 614. Monitor application 614 transfers the performance data to QoS analytics 1003. QoS analytics 1003 develops QoS instructions based on the performance data. Rules engine 1002 translates the QoS instructions into configurations for container, slice, and connection and transfers the configurations to agent application 617 over router control 1001 and network application 613. Agent application 617 transfers the slice configuration to slice application 616. Agent application 617 transfers the connection configuration to connection application 614. Agent application 617 transfers the container configuration to operating system 611. Slice application 616 and connection application 615 transfer their confiigurations to network application 613. Network application 613 exchanges user data with UEs 401-403 over router application 612. Network application 613 exchanges user data with slices 442-444 based on the configurations.

Figure 13:
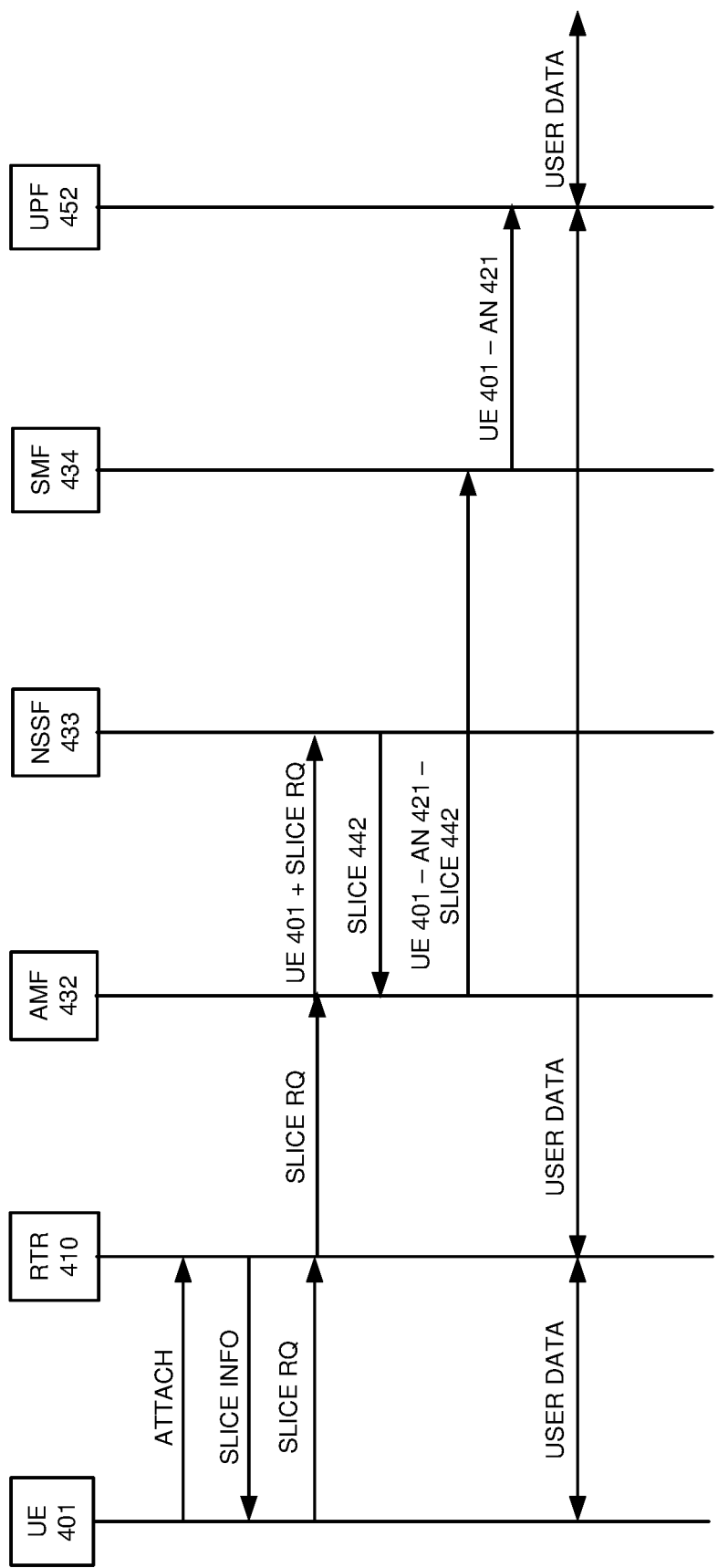
FIG. 13 illustrates an exemplary operation of the 5G wireless communication network that has the wireless router to serve the UEs over the network connections to the network slices.

FIG. 13 illustrates an exemplary operation of the 5G wireless communication network that 400 has wireless router 410 to serve UEs 401-403 over the network connections to network slices 442-444. The operation may differ in other examples. UE 401 attaches to router 410 over 5GNR AN 421. Router transfer slice information to UE 401. UE 401 requests a slice form router 410. Router 410 requests the slice for UE 401 from AMF 432. AMF 432 and NSSF 433 interact to authorize slice 442 for UE 401. AMF 432 directs SMF 434 to serve router 410 for UE 401 over slice 442. SMF 434 signals UPF 452 to serve router 410 for UE 401 over 5GNR AN 421. UE 401 and router 410 exchange user data for slice 442. Router 410 and UPF 452 exchange the user data for slice 442 based on the slice and connection configurations. UPF 452 exchanges the user data for slice 442 with external systems.

The wireless data network circuitry described above comprises computer hardware and software that form special-purpose networking circuitry to serve UEs over data routers and wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over data routers and wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data router to serve User Equipment (UEs) over network connections to network slices, the method comprising:
   a memory storing an operating system, and router applications comprising at least one of a network application and a connection application;
   processing circuitry coupled to the memory and executing the operating system, and in response, executing the router applications including the network application and the connection application in router containers, wherein the router containers comprise at least one network container for the network application and at least one connection container for the connection application;
   the router applications receiving a container configuration, a connection configuration, and a slice configuration from the wireless communication network, transferring the container configuration to the operating system, generating performance information for the network connections, and transferring the performance information to the wireless communication network;
   the operating system receiving the container configuration from the router applications and controlling processing qualities of the containers based on the container configuration; and
   the router applications prioritizing the network connections to the network slices based on the slice configuration, exchanging user data with the UEs, and exchanging the user data with the network slices over the network connections using service qualities based on the connection configuration and data throughputs indicated by the connection configuration.

2. The method of claim 1 wherein:
   the processing circuitry executing the router applications in the containers comprises executing the network application in the network container; and
   the operating system controlling the processing qualities of the containers based on the container configuration comprises controlling Central Processing Unit (CPU) resources used by the network container.

3. The method of claim 1 wherein:
   the processing circuitry executing the router applications in the containers comprises executing the network application in the network container; and
   the operating system controlling the processing qualities of the containers based on the container configuration comprises controlling data memory resources used by the network container.

4. The method of claim 1 wherein:
   the processing circuitry executing the router applications in the containers comprises executing the network application in the network container; and
   the operating system controlling the processing qualities of the containers based on the container configuration comprises increasing data processing resources used by one of the containers that exchanges the user data and decreasing other data processing resources used by another one of the containers that does not exchange the user data.

5. The method of claim 1 wherein:
the processing circuitry executing the router applications in the containers comprises executing the network application in the network container; and
the router applications receiving the container configuration and transferring the container configuration to the operating system comprises the network application receiving the container configuration and transferring the container configuration to the operating system; and
the operating system controlling the processing qualities of the containers based on the container configuration comprises controlling Input/Output (I/O) resources used by the containers.

6. The method of claim 1 wherein:
the memory storing the router applications comprises storing a monitor application;
the processing circuitry executing the router applications in the containers comprises executing the network application in the network container and the executing the monitor application in a monitor container; and
the router applications generating performance information for the network connections and transferring the performance information to the wireless communication network comprises the network application indicating data throughputs for the network connections to the monitor application and the monitor application receiving the data throughputs for the network connections and transferring the data throughputs for the network connections the wireless communication network.

7. The method of claim 1 wherein:
the memory storing the router applications comprises storing a monitor application;
the processing circuitry executing the router applications in the containers comprises executing the network application in the network container and the executing the monitor application in a monitor container; and
the router applications generating performance information for the network connections and transferring the performance information to the wireless communication network comprises the network application indicating data latencies for the network connections to the monitor application and the monitor application receiving the data latencies for the network connections and transferring the data latencies for the network connections to the wireless communication network.

8. The method of claim 1 wherein:
the processing circuitry executing the router applications in the containers comprises executing the network application in the network container and the executing the connection application in the connection container; and
the router applications receiving the connection configuration and exchanging the user data with the network slices over the network connections using the service qualities based on the connection configuration comprises the connection application receiving the connection configuration and transferring the connection configuration to the network application, and the network application exchanging the user data with the network slices over the network connections using the data throughputs indicated by the connection configuration.

9. The method of claim 1 wherein:
the processing circuitry executing the router applications in the containers comprises executing the network application in the network container and the executing the connection application in the connection container; and
the router applications receiving the connection configuration and exchanging the user data with the network slices over the network connections using the service qualities based on the connection configuration comprises the connection application receiving the connection configuration and transferring the connection configuration to the network application, and the network application exchanging the user data with the network slices over the network connections using data latencies indicated by the connection configuration.

10. The method of claim 1 wherein:
the memory storing the router applications comprises storing a slice application;
the processing circuitry executing the router applications in the containers comprises executing the network application in the network container and the executing slice application in a slice container; and
the router applications prioritizing the network connections to the network slices based on the slice configuration comprises the slice application receiving prioritized slice Identifiers (IDs) for the UEs and transferring the prioritized slice IDs for the UEs to the network application and the network application exchanging the user data with the network slices over the network connections based on the prioritized slice IDs.

11. A data router to serve User Equipment (UEs) over network connections to network slices, the data router comprising:
a memory configured to store an operating system and router applications comprising at least one of a network application and a connection application;
processing circuitry coupled to the memory and configured to execute the operating system, and in response, execute the router applications including the network application and the connection application in router containers, wherein the router containers comprise at least one network container for the network application and at least one connection container for the connection application;
the router applications configured to receive a container configuration, a connection configuration, and a slice configuration from the wireless communication network, transfer the container configuration to the operating system, generate performance information for the network connections, and transfer the performance information to the wireless communication network;
the operating system configured to receive the container configuration from the router applications and control processing qualities of the containers based on the container configuration; and
the router applications configured to prioritize the network connections to the network slices based on the slice configuration, exchange user data with the UEs, and exchange the user data with the network slices over the network connections using service qualities based on the connection configuration and data throughputs indicated by the connection configuration.

12. The data router of claim 11 wherein:
the processing circuitry is configured to execute the network application in the network container; and the operating system is configured to control Central Processing Unit (CPU) resources used by the network container based on the container configuration.

13. The data router of claim 11 wherein:
the processing circuitry is configured to execute the network application in the network container; and
the operating system is configured to control data memory resources used by the network container.

14. The data router of claim 11 wherein:
the processing circuitry is configured to execute the network application in the network container; and
the operating system is configured to increase data processing resources used by one of the containers that exchanges the user data and decrease other data processing resources used by another one of the containers that does not exchange the user data.

15. The data router of claim 11 wherein:
the processing circuitry is configured to execute the network application in the network container; and
the operating system is configured to control Input/Output (I/O) resources used by the network container.

16. The data router of claim 11 wherein:
the router applications comprise a monitor application;
the processing circuitry is configured to execute the network application in the network container and execute the monitor application in a monitor container; and
the network application is configured to indicate data throughputs for the network connections to the monitor application and the monitor application is configured to receive the data throughputs for the network connections and transfer the data throughputs for the network connections the wireless communication network.

17. The data router of claim 11 wherein:
the router applications comprise a monitor application;
the processing circuitry is configured to execute the network application in the network container and the execute the monitor application in a monitor container; and
the network application us configured to indicate data latencies for the network connections to the monitor application and the monitor application is configured to receive the data latencies for the network connections and transfer the data latencies for the network connections to the wireless communication network.

18. The data router of claim 11 wherein:
the processing circuitry is configured to execute the network application in the network container and the execute the connection application in the connection container; and
the connection application is configured to receive the connection configuration and transfer the connection configuration to the network application, and the network application is configured to exchange the user data with the network slices over the network connections using the data throughputs indicated by the connection configuration.

19. The data router of claim 11 wherein:
the processing circuitry is configured to execute the network application in the network container and execute the connection application in the connection container; and
the connection application is configured to receive the connection configuration and transfer the connection configuration to the network application, and the network application is configured to exchange the user data with the network slices over the network connections using data latencies indicated by the connection configuration.

20. The data router of claim 11 wherein:
the memory storing the router applications comprises storing a slice application;
the processing circuitry executing the router applications in the containers comprises executing the network application in the network container and the executing slice application in a slice container; and
the router applications prioritizing the network connections to the network slices based on the slice configuration comprises the slice application receiving prioritized slice Identifiers (IDs) for the UEs and transferring the prioritized slice IDs for the UEs to the network application and the network application exchanging the user data with the network slices over the network connections based on the prioritized slice IDs.

* * * * *